US 8,881,001 B2

(12) United States Patent
Ku et al.

(10) Patent No.: US 8,881,001 B2
(45) Date of Patent: Nov. 4, 2014

(54) APPARATUS AND METHOD FOR TRANSFORMING APPLICATION FOR MULTI-MODAL INTERFACE

(75) Inventors: Tai-Yeon Ku, Busan (KR); Dong-Hwan Park, Daejon (KR); Young-Sung Son, Daejon (KR); Kyeong-Deok Moon, Daejon (KR); Jun-Hee Park, Daejon (KR)

(73) Assignee: Electronics and Telecommunications Research Institute, Daejon (KR)

(*) Notice: Subject to any disclaimer, the term of this patent is extended or adjusted under 35 U.S.C. 154(b) by 1992 days.

(21) Appl. No.: 11/942,861

(22) Filed: Nov. 20, 2007

(65) Prior Publication Data

US 2008/0120447 A1    May 22, 2008

(30) Foreign Application Priority Data

Nov. 21, 2006   (KR) .................. 10-2006-0115183

(51) Int. Cl.
  *G06F 17/00* (2006.01)
  *G06F 3/038* (2013.01)

(52) U.S. Cl.
  CPC ........ *G06F 3/038* (2013.01); *G06F 2203/0381* (2013.01)
  USPC ........................................... 715/238

(58) Field of Classification Search
  CPC .............................. G06F 2203/0381
  USPC ........................................ 715/238
  See application file for complete search history.

(56) References Cited

U.S. PATENT DOCUMENTS

| 6,643,650 B1* | 11/2003 | Slaughter et al. ............. 1/1 |
| 6,700,592 B1* | 3/2004 | Kou et al. ............. 715/771 |
| 7,783,613 B2* | 8/2010 | Gupta et al. ............. 707/693 |
| 7,958,272 B2* | 6/2011 | Ko et al. ............. 709/250 |
| 8,479,101 B2* | 7/2013 | Dees ............. 715/740 |
| 2003/0093419 A1* | 5/2003 | Bangalore et al. ............. 707/3 |
| 2004/0117409 A1* | 6/2004 | Scahill et al. ............. 707/200 |

FOREIGN PATENT DOCUMENTS

| JP | 11-024813 | 1/1999 |
| KR | 1020050046580 | 5/2005 |
| KR | 1020050122720 | 12/2005 |
| KR | 2007-0119153 A | 12/2007 |

OTHER PUBLICATIONS

Simon, et al., "Tool-Supported Single Authoring for Device Independence and Multimodality" MobileHCI'05, Sep. 2005, Austria, copyright ACM, p. 91-98.*

(Continued)

*Primary Examiner* — Amelia Tapp
(74) *Attorney, Agent, or Firm* — Ladas & Parry LLP

(57) ABSTRACT

Provided are an apparatus and method for transforming an application for a multi-modal interface. The apparatus includes: a parsing means for parsing an original application to generate a parsed structure of the original application; an application transforming/creating means for transforming the parsed structure generated by the parsing means; a multi-modal synthesizing means for synthesizing the contents created by the application transforming/creating means with multi-modal information of the user terminal; a multi-modal detecting means for detecting multi-modal information received from the user terminal and transforming the detected information into contents that can be used by the device; and an action mapping means for mapping the contents, which are received from the multi-modal detecting means and can be used in the device, to action information contained in the original application to generate an event of the device according to the action information.

9 Claims, 2 Drawing Sheets

(56) References Cited

OTHER PUBLICATIONS

Reitter et al., "UI on the Fly: Generating a Multimodal User Interface" Proceedings of HLT-NAACL 2004; May 2004, p. 1-4.*

Repo et al., "Middleware Support for Implementing Context-Aware Multimodal User Interfaces" MUM 2004, Oct. 2004, copyright ACM, p. 221-227.*

Mavrommati, et al., "An editing tool that manages device associations in an in-home environment" Published online: Jun. 26, 2004 Springer-Verlag London Limited 2004, Pers Ubiquit Comput (2004) 8: p. 255-263.*

Silvia Berti, Giulio Mori, Fabio Paternò, and Carmen Santoro. 2004. A transformation-based environment for designing multi-device interactive applications. In Proceedings of the 9th international conference on Intelligent user interfaces (IUI '04). ACM, New York, NY, USA, 352-353.*

Maes, et al., "Multimodal Interaction Requirements", W3C NOTE Jan. 8, 2003, copyright 2003 W3C, retrieved from http://www.w3.org/TR/2003/NOTE-mmi-reqs-20030108/, p. 1-32.*

* cited by examiner

APPARATUS AND METHOD FOR TRANSFORMING APPLICATION FOR MULTI-MODAL INTERFACE

CROSS-REFERENCE TO RELATED APPLICATIONS

The present invention claims priority of Korean Patent Application No. 10-2006-0115183, filed on Nov. 21, 2006, which is incorporated herein by reference.

BACKGROUND OF THE INVENTION

1. Field of the Invention

The present invention relates to an apparatus and method for transforming an application for a multi-modal interface; and, more particularly, to an apparatus and method for transforming an application for a multi-modal interface. The apparatus and method create a structure of an original application transformed according to the output characteristics of a user terminal in the format of contents, synthesizes the created contents with multi-modal information of the user terminal, detects multi-modal information received from the user terminal, and maps the detected multi-modal information to action information of the original application to generate an event.

This work was supported by the Information Technology (IT) research and development program of the Korean Ministry of Information and Communication (MIC) and/or the Korean Institute for Information Technology Advancement (IITA) [2006-S-066-01, "Development of High Reliable Adaptive Middleware for u-Home"].

2. Description of Related Art

The use of Internet-accessible devices, such as PCs, PDAs, cellular phones, and watches, increases with the spread of ubiquitous environments that obscure a boundary between an indoor region and an outdoor region.

The devices have individual characteristics such as input/output characteristics, display sizes, and operating systems. Also, the devices have an individual user interface. For example, there are devices inputting data using a keyboard and a mouse, devices inputting data using a touchscreen, and devices inputting data using voice recognition without using a display.

With the establishment of the ubiquitous environments, the above devices are provided with user-centered interfaces. Such user-centered interfaces are collectively called 'multi-modal interface'. User interfaces such as a keyboard and a mouse, voice recognition, gesture recognition, device pen, action recognition, touch recognition, and organism recognition are used to establish ubiquitous computing environments without using additional devices, thereby enhancing the user-centered working efficiency.

Due to the above reasons, the device is equipped with an application reflecting its various interface characteristics. That is, the application must reflect device performance such as the resolution of a display and the limitations of input/output devices and application functions such as the types of operating systems (e.g., Windows or LINUX) and the types of graphic libraries.

A conventional application design method reflects various characteristics according to user interfaces, leading to a great waste of time and manpower. Furthermore, the conventional application design method may require a full redesign process instead of ending in a simple porting process.

The conventional application design method is unsuitable because it may perform a redesign process in the ubiquitous environments.

What is therefore required is an application design method that can save the reprocessing cost and time and increase utility even in application update, by transforming an application automatically in real time according to every device with various characteristics by only one application writing process.

SUMMARY OF THE INVENTION

An embodiment of the present invention is directed to providing an apparatus and method for transforming an application for a multi-modal interface. The apparatus and method create a structure of an original application transformed according to the output characteristics of a user terminal in the format of contents, synthesizes the created contents with multi-modal information of the user terminal, detects multi-modal information received from the user terminal, and maps the detected multi-modal information to action information of the original application to generate an event.

In accordance with an aspect of the present invention, there is provided a multi-modal application transform apparatus connected to a multi-modal user terminal to manage an original application of a device in a home network, the multi-modal application transform apparatus including: a parsing means for parsing an original application to generate a parsed structure of the original application; an application transforming/creating means for transforming the parsed structure generated by the parsing means according to the output characteristics of the user terminal to create contents that can be used by the user terminal; a multi-modal synthesizing means for synthesizing the contents created by the application transforming/creating means with multi-modal information of the user terminal; a multi-modal detecting means for detecting multi-modal information received from the user terminal and transforming the detected information into contents that can be used by the device; and an action mapping means for mapping the contents, which are received from the multi-modal detecting means and can be used in the device, to action information contained in the original application to generate an event of the device according to the action information.

In accordance with another aspect of the present invention, there is provided a multi-modal application transform method for transforming a multi-modal application provided to a multi-modal user terminal to manage an original application of a device in a home network, the multi-modal application transform method including the steps of: a) transforming the original application according to the output characteristics of the user terminal to create contents that can be used by the user terminal; b) synthesizing the contents that can be used by the user terminal with multi-modal information of the user terminal and providing the resulting data to the user terminal; c) transforming multi-modal information detected by the user terminal into contents that can be used by the device and extracting action information of the original application corresponding to the multi-modal information; d) giving, according to the multi-modal information detected by the user terminal, a score to the action information extracted from the original application corresponding to the multi-modal information; and e) transforming, according to the score given to the action information, the action information into multi-modal information that can be detected by the device, and providing the multi-modal information to the device.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
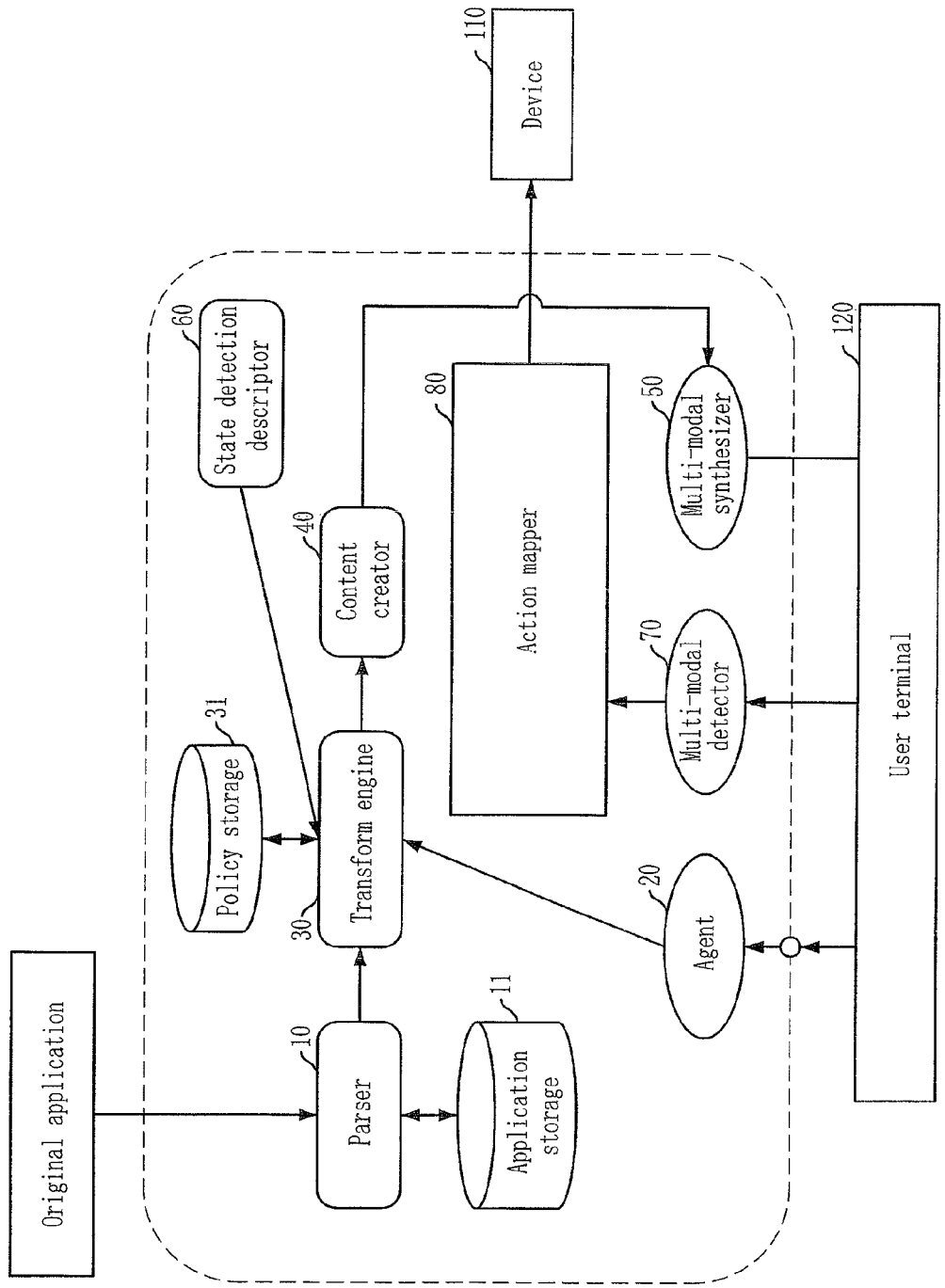
FIG. 1 is a block diagram of an apparatus for transforming an application for a multi-modal interface in accordance with an embodiment of the present invention.

FIG. 1 is a block diagram of an apparatus for transforming an application for a multi-modal interface in accordance with an embodiment of the present invention.

Referring to FIG. 1, an apparatus for transforming an application for a multi-modal interface in accordance with an embodiment of the present invention is mounted on a home server that manages every device 110 on a home network. Hereinafter, the apparatus for transforming an application for a multi-modal interface will be referred to as "application transform apparatus" 100. Herein, the application transform apparatus 100 manages an application for controlling the device 110 on the home network. Also, the application transform apparatus 100 is connected to a user terminal 120 through a variety of input/output interfaces. The application transform apparatus 100 collects and manages detailed information of the user terminal 120.

The application transform apparatus 100 includes a parser 10, an application storage 11, an agent 20, a transform engine 30, a policy storage 31, a content creator 40, a multi-modal synthesizer 50, a state detection descriptor 60, a multi-modal detector 70, and an action mapper 80.

Hereinafter, an application that is originally written by a device manufacturer will be referred as 'original application'. The parser 10 divides an original application into an eXtensible Markup Language (XML) file and metadata to generate a parsed structure of the XML file. Herein, the parser 10 stores the original application and the metadata in the application storage 11.

Also, at the request of the transform engine 30, the parser 10 provides a parsed structure of the original application by parsing the original application stored in the application storage 11.

The agent 20 collects state information of the user terminal 120, i.e., information reflecting input/output characteristics of the user terminal 120, from the user terminal 120, and provides the collected information to the transform engine 30.

The transform engine 30 transforms the parsed structure of the original application according to the information reflecting the input/output characteristics of the user terminal 120. That is, the transform engine 30 transforms the parsed structure of the original application using application transform information stored in the policy storage 31 according to the information reflecting the input/output characteristics of the user terminal 120.

Also, the transform engine 30 provides the transformed structure of the original application to the content creator 40.

The policy storage 31 stores an application transform policy according to user state information. That is, the policy storage 31 stores an application transform policy describing a transform according to the existence/non-existence of a keyboard or a sound system in the user terminal 120 and physical characteristics such as the size and resolution of a display of the user terminal 120.

The content creator 40 receives the transformed structure of the original application from the transform engine 30. Using the transformed structure of the original application, the content creator 40 creates contents according to the input/output characteristics of the user terminal 120. For example, if the user terminal 120 outputs only sound without displaying an image, the content creator 40 converts the transformed structure of the original application into a voice-XML format. Also, the content creator 40 creates contents of a format such as XML and User Interface Markup Language (UIML) according to the input/output characteristics of the user terminal 120.

Also, the content creator 40 provides the created XML contents to the multi-modal synthesizer 50.

Upon receipt of the contents from the content creator 40, the multi-modal synthesizer 50 synthesizes the received contents into multi-modal information for supporting the output characteristics of the user terminal 120. For example, the multi-modal synthesizer 50 synthesizes texts such as XML documents received from the content creator 40 into voice information according to the output characteristics of the user terminal 120, and provides the voice information to the user terminal 120. Also, the multi-modal synthesizer 50 synthesizes image information received from the content creator 40 into texts according to the output characteristics of the user terminal 120, and provides the texts to the user terminal 120.

The state detection descriptor 60 receives user state information from the home server and provides the user sate information to the transform engine 30.

The action mapper 80 maps multi-modal information, which is received from the multi-modal detector 70, to action information, which is contained in the original application, to generate an event. For example, if multi-modal information in the form of a voice 'Turn Off The Light' is received from the multi-modal detector 70, the action mapper 80 maps the multi-modal information 'Turn Off The Light' to action information 'Click Turn-Off Button' contained in the original application, to generate an event of giving a 'Turn Off' command to an electric lighting device corresponding to the device 110.

In order to support various input characteristics of the user terminal 120, the multi-modal detector 70 detects multi-modal information received from the user terminal 120 and provides the detected multi-modal information to the action mapper 80. For example, the multi-modal detector 70 detects voice information, i.e., multi-modal information received from the user terminal 120 in the form of a voice, and provides the detected voice information to the action mapper 80, so that the voice information can be transformed into texts such as XML documents. Also, the multi-modal detector 70 detects gesture information, i.e., multi-modal information received from the user terminal 120 in the form of a gesture, and provides the detected gesture information to the action mapper 80, so that the gesture information can be transformed into texts such as XML documents.

Figure 2:
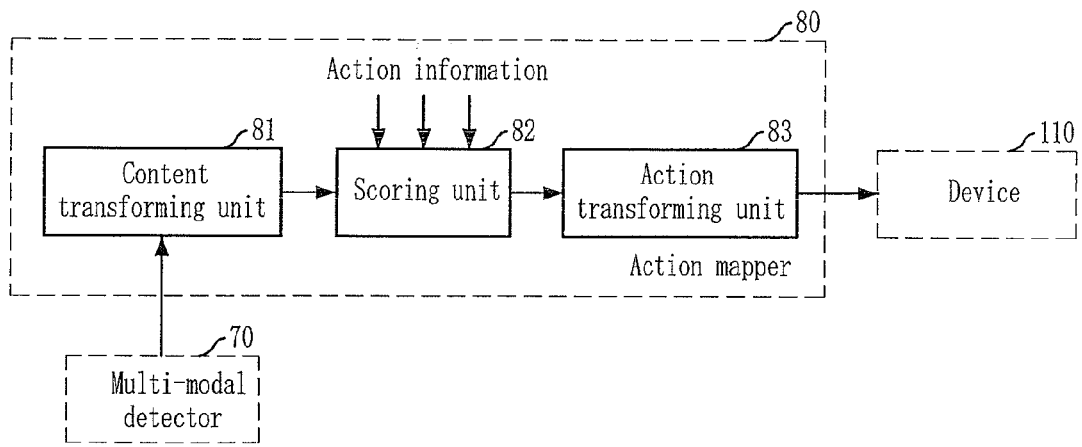
FIG. 2 is a block diagram of an action mapper in accordance with an embodiment of the present invention.

FIG. 2 is a block diagram of the action mapper 80 in accordance with an embodiment of the present invention.

Referring to FIG. 2, the action mapper 80 in accordance with an embodiment of the present invention includes a content transforming unit 81, a scoring unit 82, and an action transforming unit 83.

The content transforming unit 81 reprocesses the multi-modal information detected by the multi-modal detector 70 into texts, i.e., XML documents that will be used in the scoring unit 82. In this context, the content transforming unit 81 analyzes the original application, which is currently used in the user terminal 120, extracts action information of the original application corresponding to the multi-modal information, and provides the extracted action information to the scoring unit 82. For example, the content transforming unit 81 reprocesses the voice information 'Turn Off The Light', which is multi-modal information received from the multi-modal detector 70, into XML documents that can be used in the scoring unit 82. In this context, the content transforming unit 81 analyzes the original application, which is currently used in the user terminal 120, extracts action information 'Turn On' and 'Turn Off' corresponding to multi-modal information 'Turn Off The Light', which can occur in the current state, and provides the extracted action information to the scoring unit 82.

Using the multi-modal information received from the multi-modal detector 70, the scoring unit 82 gives a score to the action information extracted by the content transforming unit 81 on the basis of the current state. The scoring unit 82 provides the given score result to the action transforming unit 83.

According to the score result received from the scoring unit 82, the action transforming unit 83 transforms the action information into multi-modal information that can be detected by the device 110, to provide a service.

Figure 3:
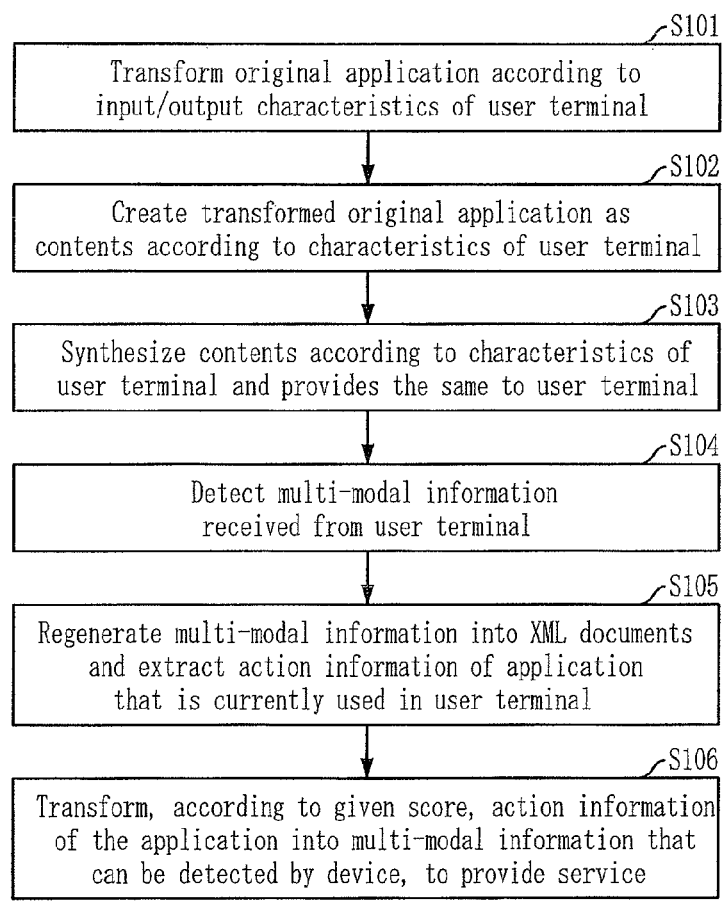
FIG. 3 is a flowchart describing a method for transforming an application for a multi-modal interface in accordance with an embodiment of the present invention.

FIG. 3 is a flowchart describing a method for transforming an application for a multi-modal interface in accordance with an embodiment of the present invention.

Referring to FIG. 3, the application transform apparatus 100 of the present invention transforms an original application according to the input/output characteristics of the user terminal 120, in step S101.

In step S102, the application transform apparatus 100 creates the transformed original application as contents according to the characteristics of the user terminal 120.

In step S103, the application transform apparatus 100 synthesizes the contents according to the characteristics of the user terminal 120 and provides the same to the user terminal 120.

Then, the application transform apparatus 100 can initiate a service.

In step S104, the application transform apparatus 100 detects multi-modal information received from the user terminal 120. In step S105, the application transform apparatus 100 reprocesses the detected multi-modal information into XML documents and extracts action information of an application that is currently used in the user terminal 120.

In step S106, according to a given score, the application transform apparatus 100 transforms the action information of the application into multi-modal information that can be detected by the device 110, to provide a service.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

As described above, the present invention automatically transforms an application for every device according to the input/output characteristics of all user terminals, thereby obviating the need to separately produce an application for every device.

Also, the present invention automatically transforms an application according to every device with various characteristics by one application writing process, thereby saving the reprocessing cost and time.

Also, the present invention is high utility because it can easily reflect the update and maintenance of an application.

While the present invention has been described with respect to the specific embodiments, it will be apparent to those skilled in the art that various changes and modifications may be made without departing from the spirit and scope of the invention as defined in the following claims.

What is claimed is:

1. A multi-modal application transform apparatus connected to a multi-modal user terminal to manage an original application of a device in a home network, the multi-modal application transform apparatus comprising:
   a parsing means for receiving the original application of the device, and
   wherein the parsing means parses the received original application of the device to generate a parsed structure of the original application;
   an application transforming/creating means for transforming the parsed structure generated by the parsing means according to output characteristics of a user terminal to create contents that can be used by the user terminal,
   wherein the user terminal is any type of a wired or wireless computer device comprising but not limited to at least one of a person computer (PC), person digital assistance (PDA), cellular phone, or watch;
   a multi-modal synthesizing means for synthesizing the contents created by the application transforming/creating means with multi-modal information of the user terminal;
   a multi-modal detecting means for detecting the multi-modal information received from the user terminal and transforming the detected information into contents that can be used by the device; and
   an action mapping means for mapping the contents, which are received from the multi-modal detecting means and can be used in the device, to action information contained in the original application to generate an event of the device according to the action information,
   wherein the received original application having the action information to generate the event of the device is received by the parsing means
   wherein the parsing means automatically transforms the original application based on the output characteristics of the respective user terminal by one application writing process in order to have the action information in the original application to generate the event of the device, and
   wherein the one application writing process automatically transforms the original application in real time based on each and every one of the output characteristics of at least two or more different user terminals.

2. The multi-modal application transform apparatus of claim 1, wherein the action mapping means includes:
  a content transforming unit for transforming multi-modal information detected by the multi-modal detecting means into contents that can be used by the device and extracting action information of the original application corresponding to the multi-modal information;
  a scoring unit for giving, using the multi-modal information detected by the multi-modal detecting means, a score to the action information extracted by the content transforming unit on the basis of the current state; and
  an action transforming unit for transforming, according to the score result received from the scoring unit, the action information into multi-modal information that can be detected by the device, and providing the multi-modal information to the device.

3. The multi-modal application transform apparatus of claim 1, wherein the application transforming/creating means pre-stores and uses a policy describing a transform of the original application according to the output characteristics of the user terminal.

4. The multi-modal application transform apparatus of claim 1, wherein the application transforming/creating means creates contents that can be used by the user terminal in a text format.

5. The multi-modal application transform apparatus of claim 1, wherein the multi-modal detecting means transforms contents that can be used by the device into a text format.

6. A multi-modal application transform method for transforming a multi-modal application provided to a multi-modal user terminal to manage an original application of a device in a home network, the multi-modal application transform method comprising the steps of:
  a) receiving the original application and then transforming the original application of the device according to output characteristics of a user terminal to create contents that can be used by the user terminal,
  wherein the user terminal is any type of a wired or wireless computer device comprising but not limited to at least one of a person computer (PC), person digital assistance (PDA), cellular phone, or watch;
  b) synthesizing the contents that can be used by the user terminal with multi-modal information of the user terminal and providing the resulting data to the user terminal;
  c) transforming the multi-modal information detected by the user terminal into contents that can be used by the device and extracting action information of the original application corresponding to the multi-modal information;
  d) giving, according to the multi-modal information detected by the user terminal, a score to the action information extracted from the original application corresponding to the multi-modal information; and
  e) transforming, according to the score given to the action information, the action information into multi-modal information that can be detected by the device, and providing the multi-modal information to the device,
  wherein the received original application having the action information transformed into the multi-modal information that can be detected by the device is received,
  wherein the parsing means automatically transforms the original application based on the output characteristics of the respective user terminal by one application writing process in order to have the action information in the original application be transformed to the multi-modal information that can be detected by the device, and
  wherein the one application writing process automatically transforms the original application in real time based on each and every one of the output characteristics of at least two or more different user terminals.

7. The multi-modal application transform method of claim 6, wherein the contents that can be used by the user terminal are created in a text format in the step a).

8. The multi-modal application transform method of claim 6, wherein the multi-modal information detected by the user terminal is transformed into text contents in the step c).

9. A multi-modal application transform apparatus connected to a multi-modal user terminal to manage an original application of a device in a home network, the multi-modal application transform apparatus comprising:
  a parsing means for receiving the original application of the respective device, and
  wherein the parsing means parses the received original application of the device to generate a parsed structure of the original application;
  an application transforming/creating means for transforming the parsed structure generated by the parsing means according to output characteristics of a user terminal to create contents used by the user terminal,
  wherein the user terminal is any type of a wired or wireless computer device comprising but not limited to at least one of a person computer (PC), person digital assistance (PDA), cellular phone, or watch;
  a multi-modal synthesizing means for synthesizing the contents created by the application transforming/creating means with multi-modal information of the user terminal;
  a multi-modal detecting means for detecting the multi-modal information received from the user terminal and transforming the detected information into contents that can be used by the device; and
  an action mapping means for mapping the contents, which are received from the multi-modal detecting means and can be used in the device, to action information contained in the original application to generate an event of the device according to the action information,
  wherein the received original application having the action information to generate the event of the device is received by the parsing means based on the output characteristics of the user terminal by one application writing process in order to have the action information in the original application to generate the event of the device,
  wherein the multi-modal application transform apparatus receives the original application having the action information of the original device in order to have the user terminal create content to generate the event of the device, and
  wherein the one application writing process automatically transforms the original application in real time based on each and every one of the output characteristics of at least two or more different user terminals.

* * * * *